S. P. M. TASKER.
MACHINE FOR WELDING METAL TUBES.

No. 186,768. Patented Jan. 30, 1877.

2 Sheets—Sheet 1.

Witnesses
Thomas J. Bewley.
George C. Hetzel.

Inventor
Stephen P. M. Tasker.
per Stephen Ustick Attorney

2 Sheets—Sheet 2.

S. P. M. TASKER.
MACHINE FOR WELDING METAL TUBES.

No. 186,768. Patented Jan. 30, 1877.

Witnesses
Thomas J. Bewley.
George C. Hetzel.

Inventor
Stephen P. M. Tasker
per Stephen Ustick Attorney

UNITED STATES PATENT OFFICE.

STEPHEN P. M. TASKER, OF PHILADELPHIA, PENNSYLVANIA.

IMPROVEMENT IN MACHINES FOR WELDING METAL TUBES.

Specification forming part of Letters Patent No. 186,768, dated January 30, 1877; application filed December 29, 1876.

*To all whom it may concern:*

Be it known that I, STEPHEN P. M. TASKER, of the city and county of Philadelphia, in the State of Pennsylvania, have invented a new and useful Improvement in Lap-Welding Metal Tubes, which improvement is fully set forth in the following specification, reference being had to the accompanying drawings, in which—

Figure 1:
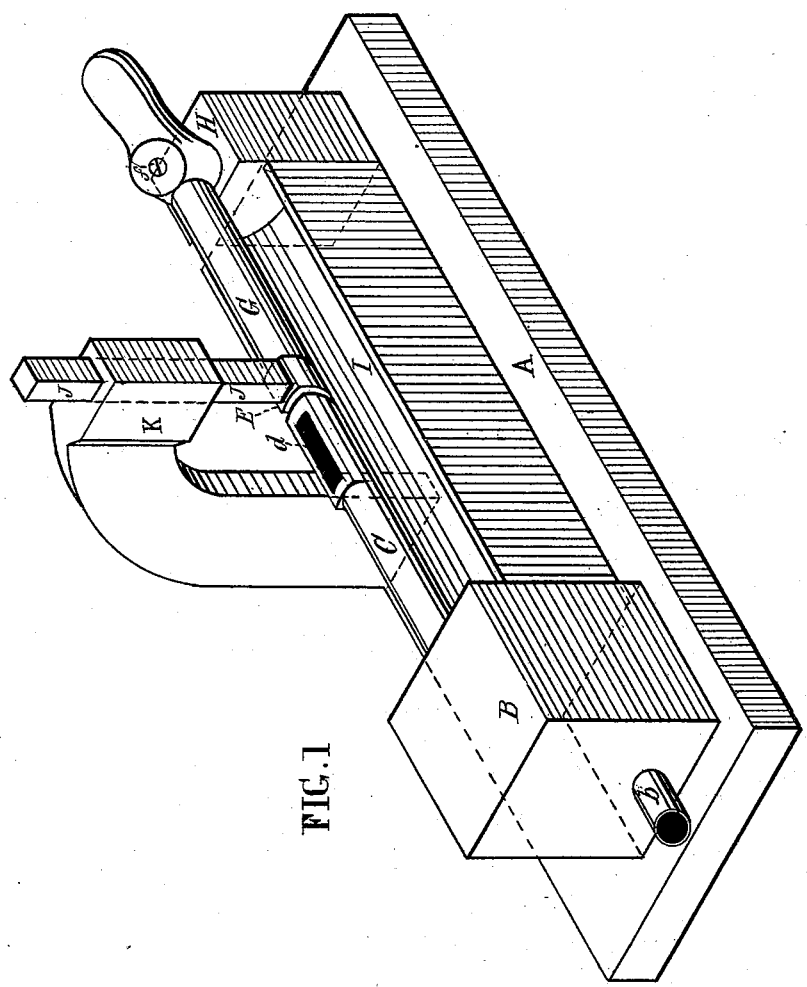
Figure 2:
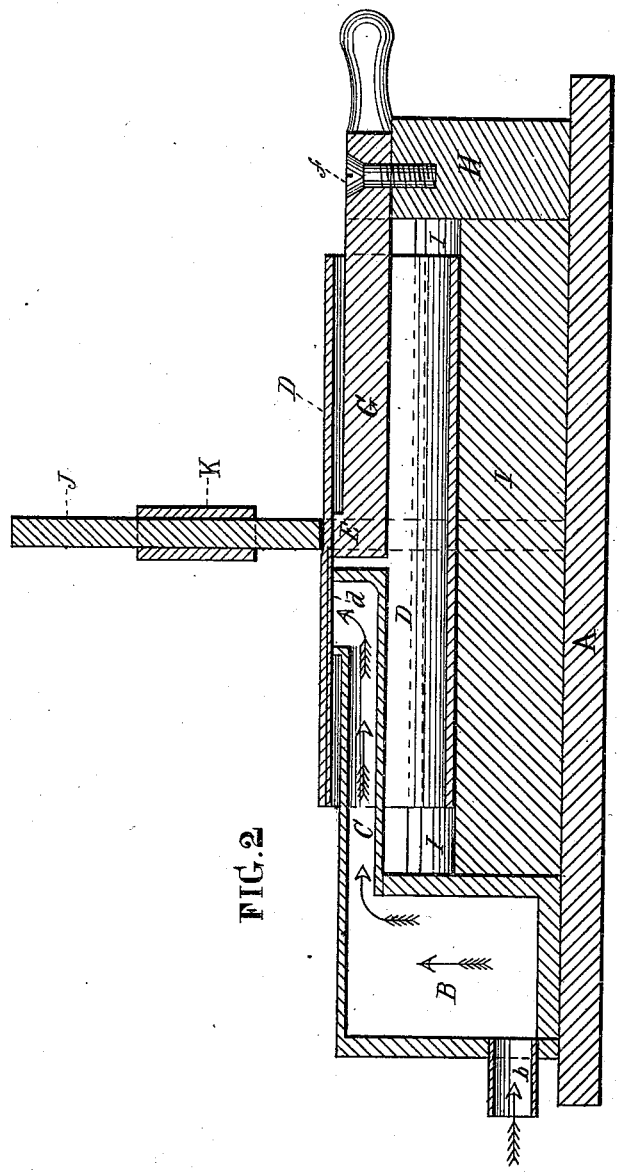

Figure 1 is an isometrical view of my improved apparatus. Fig. 2, Sheet No. 2, is a longitudinal vertical section at the line $x$ $x$ of Fig. 1, the tube being in position for the welding operation.

Like letters of reference in both figures indicate the same parts.

The nature of my invention consists in the combination of an anvil and hammer with a furnace provided with a horizontal heat-conducting pipe, which projects from one side of the furnace, and has its discharge-hole on its upper side near the projecting end. The face of the hole is in line with the face of the anvil. The anvil is formed on the end of a stout bar or shaft, which is pivoted at its other end, to admit of its being swung out of line with the heat-conducting pipe, for the reception of the tubes, and for their removal after welding. For this purpose there may be a handle on its outer end. Beneath the heat-conducting pipe and anvil-shaft is a concave bed, which supports the lower sides of the tubes to be welded, and forms a guide in its passage, as the welding edges of the tube are brought over the heat-conducting pipe and anvil during the welding operation. The heat-conducting pipe is lined with a suitable refractory material, to resist the action of the heat.

I do not confine myself to having the discharge-opening of the heat-conducting pipe through its upper side, as it may be through any part of its circumference, or through its end.

A is the bed-plate, to which the several parts of the apparatus are attached. B is a furnace, which has a blast-pipe, $b$. At the top of the furnace is a heat-conducting pipe, C, which is lined with a suitable refractory material. It has a discharge-hole, $d$, through which the heat issues onto the welding edges of the tube D. E is an anvil, on one end of the shaft G, which is pivoted to the support H by means of the bolt $f$, to admit of its being turned out of line with the heat-conducting pipe to receive the tube, and then to be brought again into line with said pipe for the welding operation. It may have a handle on its outer end for its manipulation, as shown in the drawings. I is a concave bed, which supports the lower side of the tube, while the welding edges slide over the seat of the discharge-opening of the heat-conducting pipe and the anvil, to be brought to a welding heat, and welded together by the blows of the hammer J. The hammer has its vertical movements in the standard K, which projects upward from the bed-plate A.

I do not confine myself to the particular form of the hammer, nor to the vertical movement, as it may be made of any desired form, and have any other movement produced by any suitable mechanism.

The discharge-opening $d$ is shown in the drawings at the upper side of the heat-conducting pipe; but it may be made through any part of its circumference, or through its end.

I propose making the concave bed of various radii, and adjustable in height to suit different sizes of tubes.

I claim as my invention—

1. The combination of the furnace B, provided with a laterally-projecting heat-conducting pipe, C, having a discharge-opening, $d$, through any part of its circumference, or through its end, the shaft G, and anvil F, substantially as described.

2. The shaft G, provided with the anvil E, in combination with the heat-conducting pipe C and hammer J, substantially as and for the purpose set forth.

3. The shaft G, having an anvil, E, at one end, and pivoted to a support at the other end by means of a bolt, $f$, or hinged by any suitable device, to admit of its being swung out of line with the heat-conducting pipe C, for the reception and removal of the tubes, substantially as set forth.

4. The concave bed I, arranged in relation to the heat-conducting pipe C and anvil E, substantially in the manner and for the purpose set forth.

STEPHEN P. M. TASKER.

Witnesses:
 THOMAS J. BEWLEY,
 STEPHEN USTICK.